US010755865B2

(12) United States Patent
Kubo et al.

(10) Patent No.: US 10,755,865 B2
(45) Date of Patent: Aug. 25, 2020

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Daisuke Kubo, Osaka (JP); Yoshinori Takamuku, Kyoto (JP); Doyu Hachisu, Yamaguchi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 8 days.

(21) Appl. No.: 16/191,004

(22) Filed: Nov. 14, 2018

(65) Prior Publication Data

US 2019/0103230 A1   Apr. 4, 2019

Related U.S. Application Data

(63) Continuation of application No. PCT/JP2017/019651, filed on May 26, 2017.

(30) Foreign Application Priority Data

May 31, 2016   (JP) .................................. 2016-109506

(51) Int. Cl.
*H01G 9/10* (2006.01)
*H01G 9/008* (2006.01)
*H01G 9/00* (2006.01)

(52) U.S. Cl.
CPC ............... *H01G 9/10* (2013.01); *H01G 9/008* (2013.01); *H01G 9/0032* (2013.01)

(58) Field of Classification Search
CPC .......... H01G 9/10; H01G 9/0032; H01G 9/008
See application file for complete search history.

(56) References Cited

U.S. PATENT DOCUMENTS 3,335,335 A * 8/1967 Perkins ................... H01G 9/10
361/519
5,766,271 A   6/1998 Suenaga et al.
(Continued)

FOREIGN PATENT DOCUMENTS

JP   9-007901      1/1997
JP   2013-187446   9/2013

OTHER PUBLICATIONS

International Search Report of PCT application No. PCT/JP2017/019651 dated Aug. 8, 2017.

*Primary Examiner* — Dion Ferguson
(74) *Attorney, Agent, or Firm* — McDermott Will & Emery LLP

(57) ABSTRACT

An electrolytic capacitor includes a capacitor element; a bottomed case that houses the capacitor element; a sealing member that seals an opening of the bottomed case; a tab terminal connected to the capacitor element and penetrating through the sealing member; and a resin layer that covers at least part of a main surface of the sealing member, the main surface being disposed outside the bottomed case. The tab terminal includes a first portion containing a first metal and a second portion containing a second metal. The resin layer is in contact with the first portion and the second portion. Linear expansion coefficient $\alpha_1$ of the first metal, linear expansion coefficient $\alpha_2$ of the second metal, and linear expansion coefficient $\alpha_r$ of the resin layer satisfy a relation of $\alpha_1 < \alpha_r < \alpha_2$ or $\alpha_r < \alpha_1 < \alpha_2$.

7 Claims, 2 Drawing Sheets

(56) References Cited

U.S. PATENT DOCUMENTS

| | | | | |
|---|---|---|---|---|
| 6,366,447 B1* | 4/2002 | Nakaaki | ............ | H01G 9/10 |
| | | | | 361/518 |
| 7,262,953 B2* | 8/2007 | Ozawa | ............ | H01G 9/008 |
| | | | | 361/503 |
| 2004/0174659 A1* | 9/2004 | Kawahara | ............ | H01G 9/008 |
| | | | | 361/520 |
| 2009/0323254 A1* | 12/2009 | Yamane | ............ | H01G 9/008 |
| | | | | 361/520 |
| 2010/0053847 A1* | 3/2010 | Tani | ............ | H01G 9/035 |
| | | | | 361/505 |
| 2010/0202095 A1* | 8/2010 | Kyouda | ............ | H01G 2/106 |
| | | | | 361/301.3 |
| 2012/0236469 A1* | 9/2012 | Takahara | ............ | H01G 9/10 |
| | | | | 361/518 |
| 2012/0267161 A1* | 10/2012 | Yano | ............ | H01G 4/228 |
| | | | | 174/520 |
| 2015/0016025 A1* | 1/2015 | Yanaka | ............ | H01G 9/008 |
| | | | | 361/518 |
| 2016/0035495 A1* | 2/2016 | Komatsu | ............ | H01G 9/151 |
| | | | | 361/534 |
| 2017/0092428 A1* | 3/2017 | Aoyama | ............ | H01G 9/028 |
| 2017/0271085 A1* | 9/2017 | Tsubaki | ............ | H01G 9/15 |

* cited by examiner

ELECTROLYTIC CAPACITOR AND METHOD FOR MANUFACTURING SAME

RELATED APPLICATIONS

This application is a continuation of the PCT International Application No. PCT/JP2017/019651 filed on May 26, 2017, which claims the benefit of foreign priority of Japanese patent application No. 2016-109506 filed on May 31, 2016, the contents all of which are incorporated herein by reference.

TECHNICAL FIELD

The present disclosure relates to an electrolytic capacitor including a resin layer that covers at least part of a sealing member and a method for manufacturing the electrolytic capacitor.

BACKGROUND

An electrolytic capacitor includes a capacitor element, a bottomed case that houses the capacitor element, and a sealing member that seals an opening of the bottom case. Tab terminals for extracting electricity are connected to the capacitor element. The sealing member sometimes deteriorates due to oxidation under a high-temperature environment. When the sealing member deteriorates, a sealing property of the electrolytic capacitor deteriorates. Accordingly, a technique of protecting an upper surface of a sealing member with a resin layer has been proposed (for example, see Unexamined Japanese Patent Publication No. H09-7901 and Unexamined Japanese Patent Publication No. 2013-187446).

SUMMARY

One aspect of the present disclosure relates to an electrolytic capacitor including a capacitor element; a bottomed case that houses the capacitor element; a sealing member that seals an opening of the bottomed case; a tab terminal connected to the capacitor element and penetrating through the sealing member; a resin layer that covers at least part of a main surface of the sealing member which is disposed outside the bottomed case. The tab terminal includes a first portion containing a first metal and a second portion containing a second metal. The resin layer is in contact with the first portion and the second portion. Linear expansion coefficient a1 of the first metal, linear expansion coefficient $\alpha_2$ of the second metal, and linear expansion coefficient $\alpha_r$ of the resin layer satisfy a relation of $\alpha_1<\alpha_r<\alpha_2$ or $\alpha_r<\alpha_1<\alpha_2$.

Another aspect of the present disclosure relates to a method for manufacturing an electrolytic capacitor. This method includes sealing an opening of a bottomed case with a sealing member, the bottomed case housing a capacitor element to which a tab terminal is connected, the sealing member being a member through which the tab terminal extending from the capacitor element penetrates, and forming, after the sealing, a resin layer on a main surface of the sealing member so as to cover at least part of the main surface, the main surface being disposed outside the bottomed case. The tab terminal includes a first portion containing a first metal and a second portion containing a second metal. The resin layer is in contact with the first portion and the second portion. Linear expansion coefficient $\alpha_1$ of the first metal, linear expansion coefficient $\alpha_2$ of the second metal, and linear expansion coefficient $\alpha_r$ of the resin layer satisfy a relation of $\alpha_1<\alpha_r<\alpha_2$ or $\alpha_r<\alpha_1<\alpha_2$.

In an electrolytic capacitor including a resin layer covering at least part of a main surface of a sealing member, deterioration in the resin layer can be suppressed.

DESCRIPTION OF EMBODIMENT

Figure 1:
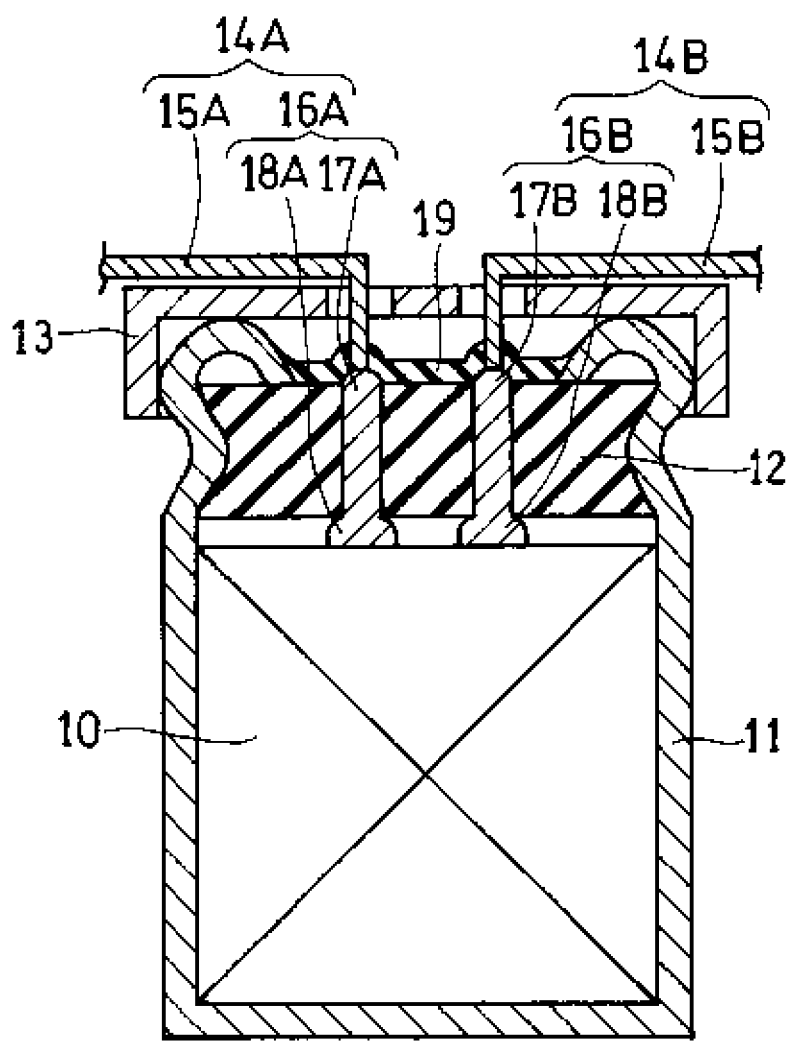
FIG. 1 is a schematic sectional view illustrating an electrolytic capacitor according to one exemplary embodiment of the present disclosure.

Prior to describing an exemplary embodiment of the present disclosure, a problem in conventional techniques will be briefly described. A tab terminal includes at least a rod-shaped portion penetrating through a sealing member and a filamentous portion (lead wire) extending from a distal end of the rod-shaped portion, and the distal end of the rod-shaped portion is exposed outward from the sealing member. When a main surface of the sealing member, which is exposed outward, is covered with a resin layer, the resin layer is in contact with the distal end of the rod-shaped portion and the filamentous portion near the distal end. The rod-shaped portion and the filamentous portion are generally formed by using different materials, and hence differ in expansion coefficient under a high-temperature environment. For this reason, when the tab terminal is exposed to heat, stress is sometimes applied to the resin layer in contact with both the rod-shaped portion and the filamentous portion, and the resin layer deteriorates.

[Electrolytic Capacitor]

An electrolytic capacitor according to one exemplary embodiment of the present disclosure includes a capacitor element, a bottomed case that houses the capacitor element, a sealing member that seals an opening of the bottomed case, a tab terminal connected to the capacitor element and penetrating through the sealing member, and a resin layer that covers at least part of a main surface of the sealing member, the main surface being disposed outside the bottomed case. The tab terminal includes a first portion containing a first metal and a second portion containing a second metal. The resin layer is in contact with the first portion and the second portion. And linear expansion coefficient $\alpha_1$ of the first metal, linear expansion coefficient $\alpha_2$ of the second metal, and linear expansion coefficient $\alpha_r$ of the resin layer satisfy a relation of $\alpha_1<\alpha_r<\alpha_2$ or $\alpha_r<\alpha_1<\alpha_2$.

An electrolytic capacitor is obtained by a manufacturing method including sealing an opening of a bottomed case with a sealing member, the bottomed case housing a capacitor element to which a tab terminal is connected, the sealing member being a member through which the tab terminal extending from the capacitor element penetrates, and forming, after the sealing, a resin layer on a main surface of the sealing member so as to cover at least part of the main surface, the main surface being disposed outside the bottomed case. In this case, the tab terminal includes a first portion containing a first metal and a second portion containing a second metal. The resin layer is in contact with the first portion and the second portion. Linear expansion coefficient $\alpha_1$ of the first metal, linear expansion coefficient $\alpha_2$ of the second metal, and linear expansion coefficient $\alpha_r$ of the resin layer satisfy a relation of $\alpha_1<\alpha_r<\alpha_2$ or $\alpha_r<\alpha_1<\alpha_2$.

When the opening of the bottomed case is sealed after the resin layer is formed in advance on the outside main surface of the sealing member, stress is sometimes applied to the resin layer at the time of the sealing, resulting in deterioration. For that reason, after the bottomed case is sealed with the sealing member, the resin layer is then formed. In this case, the resin layer comes into contact with the tab terminal penetrating though the sealing member. The tab terminal generally includes a plurality of regions (for example, a rod-shaped portion penetrating through the sealing member and a filamentous portion (that is, a lead wire) extending from a distal end of the rod-shaped portion) respectively formed from metals having different linear expansion coefficients. Accordingly, when heat is applied to the tab terminal under a high-temperature environment while the resin layer is in contact with the respective regions, the respective regions differ in expansion coefficient, and stress is sometimes applied to the resin layer, resulting in deterioration, cracks, and the like.

In general, a linear expansion coefficient of a resin layer tends to be greater than an expansion coefficient of a metal tab terminal. According to the exemplary embodiment of the present disclosure, however, the resin layer is in contact with the first portion and the second portion of the tab terminal, which respectively contain the first metal and the second metal, and linear expansion coefficient $\alpha_1$ of the first metal, linear expansion coefficient $\alpha_2$ of the second metal, and linear expansion coefficient $\alpha_r$ of the resin layer satisfy a relation of $\alpha_1 < \alpha_r < \alpha_2$ or $\alpha_r < \alpha_1 < \alpha_2$. That is, when $\alpha_1 < \alpha_2$, $\alpha_r$ is set to be smaller than $\alpha_2$ or $\alpha_1$. This can reduce stress that is applied to the resin layer because of a large difference in expansion coefficient between the first portion and the second portion or large differences in expansion coefficient between these portions and the resin layer even when heat is applied to the tab terminal under a high-temperature environment. Accordingly, this can suppress deterioration (for example, damage such as cracking) in the resin layer. Suppressing the deterioration in the resin layer will suppress deterioration in the sealing member due to oxidation. This makes it possible to easily ensure an insulating property and suppress increase in leakage current. In addition, in an electrolytic capacitor including an electrolytic solution, since evaporation of the electrolytic solution can be suppressed, shortening of product lifetime can be suppressed.

The tab terminal will be described in more detail. The second portion is connected to the capacitor element and has the rod-shaped portion penetrating through the sealing member. The first portion has the filamentous portion (lead wire) extending from a distal end of the rod-shaped portion. The filamentous portion is exposed from the sealing member. In this structure, since a connecting portion between the distal end portion of the rod-shaped portion and the filamentous portion is exposed from the sealing member, the resin layer easily comes into contact with both the distal end portion of the rod-shaped portion and the filamentous portion. This makes the resin layer be easily affected by a difference in linear expansion coefficient between the first metal and the second metal. Even in this case, making linear expansion coefficient $\alpha_r$ of the resin layer satisfy the relation of $\alpha_1 < \alpha_r < \alpha_2$ or $\alpha_r < \alpha_1 < \alpha_2$ can suppress deterioration in the resin layer. Note that the second portion may further include a flat portion connected to the capacitor element. The rod-shaped portion extends from an end portion of the flat portion which is located at a side opposite to the capacitor element, and the filamentous portion is connected to an end portion of the rod-shaped portion which is located at a side opposite to the flat portion.

In a preferred exemplary embodiment, the resin layer is in contact with an opening end (including a portion near the opening end) of the bottomed case. The bottomed case may be sealed by crimping the sealing member near the opening end of the bottomed case. The bottomed case is usually made of the same metal as the first metal or the second metal. For that reason, when the resin layer is in contact with the bottomed case, it is possible to reduce a difference in expansion coefficient between the resin layer and the bottomed case even if heat is applied under a high-temperature environment. Accordingly, this can suppress deterioration in the resin layer even in a region in contact with the bottomed case.

The first metal preferably includes at least one of metal selected from the group consisting of iron, copper, nickel, and tin. The second metal preferably includes aluminum. In this case, linear expansion coefficient $\alpha_r$ of the resin layer can be easily adjusted while high conductivity of the tab terminal is ensured.

The sealing member may contain rubber. The sealing member containing rubber is susceptible to oxidation deterioration, in particular. Use of even such a sealing member makes it possible to suppress oxidation deterioration by covering the sealing member with the resin layer and further suppressing deterioration in the resin layer.

The resin layer can contain a resin and a filler. A content of the filler in the resin layer is preferably between 30 wt % and 80 wt % (inclusive). In this case, linear expansion coefficient $\alpha_r$ is easily adjusted, and deterioration in the resin layer is easily suppressed.

Note that a linear expansion coefficient means a rate of change in a length of a test specimen when a temperature rise from a first temperature to a second temperature at a predetermined temperature rise rate, and the unit is a reciprocal of temperature (/° C.). When the resin layer is formed from a cured material of a curable resin composition, linear expansion coefficient $\alpha_r$ is a linear expansion coefficient of the cured material. The linear expansion coefficient can be measured by using, for example, a commercially available thermomechanical analyzer.

This exemplary embodiment will be described in more detail below with reference to the accompanying drawings. However, the present disclosure is not limited by the following exemplary embodiment.

Figure 2:
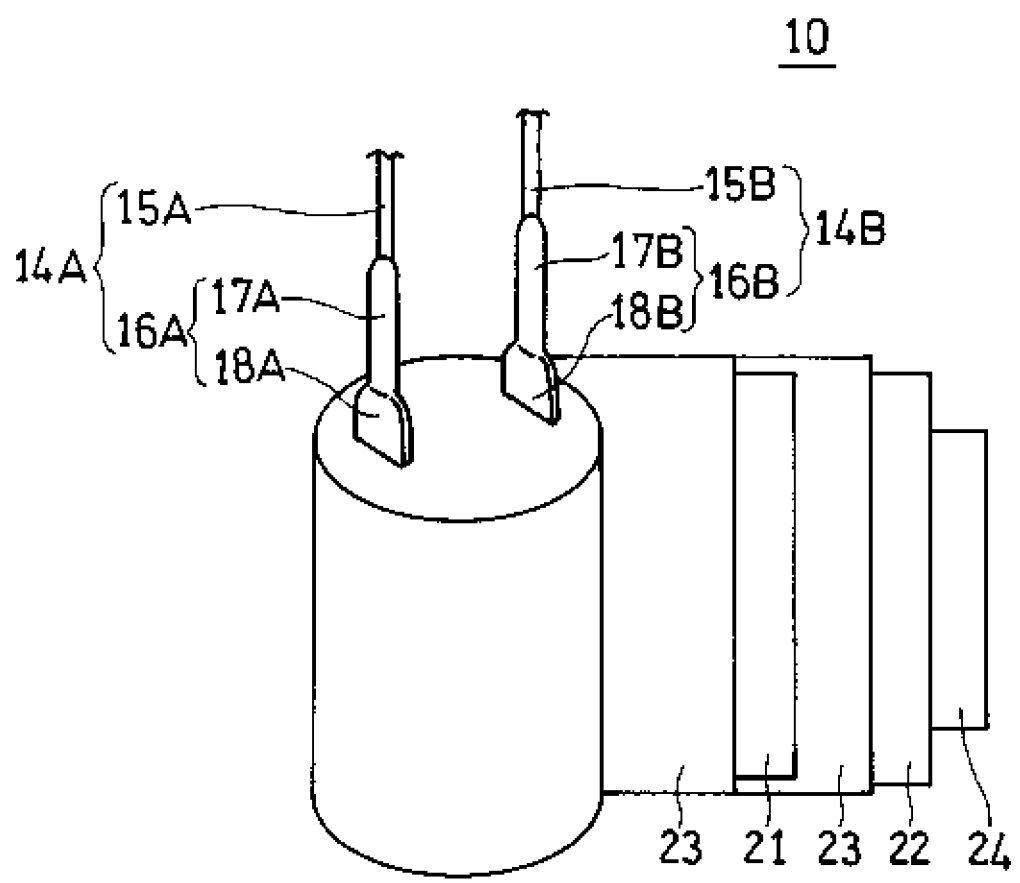
FIG. 2 is a schematic view for explaining a configuration of a capacitor element in the electrolytic capacitor in FIG. 1.

FIG. 1 is a schematic sectional view illustrating an electrolytic capacitor according to the exemplary embodiment. FIG. 2 is a schematic development view illustrating part of a wound structure associated with the same electrolytic capacitor.

The electrolytic capacitor includes, for example, capacitor element 10, bottomed case 11 that houses capacitor element 10, sealing member 12 that seals an opening of bottomed case 11, seat plate 13 that covers sealing member 12, tab terminals 14A, 14B that penetrate through sealing member 12, and a liquid component (not shown) such as an electrolytic solution. Capacitor element 10 is housed, together with a liquid component, in bottomed case 11. A portion near an opening end of bottomed case 11 is drawn inwardly, and the opening end is curled so as to crimp sealing member 12.

Tab terminals 14A, 14B respectively include first portions (filamentous portions) 15A, 15B, each containing a first metal, and second portions 16A, 16B respectively connected to first portions 15A, 15B. Second portions 16A, 16B each contain a second metal. Second portions 16A, 16B respectively include rod-shaped portions 17A, 17B each penetrating through sealing member 12. Further, second portions 16A, 16B respectively include flat portions 18A, 18B which are respectively integrated with rod-shaped portions 17A, 17B. Distal end portions of rod-shaped portions 17A, 17B are exposed outward from sealing member 12. Filamentous portions (lead wires) 15A, 15B respectively extend from the distal end portions of rod-shaped portions 17A, 17B. And filamentous portions 15A, 15B are respectively inserted into holes formed in seat plate 13 so as to be led out from seat plate 13. Second portions 16A, 16B are connected to capacitor element 10 via flat portions 18A, 18B.

Resin layer 19 is formed on a main surface (upper surface) of sealing member 12 so as to cover the main surface. The main surface is disposed outside bottomed case 11. Thus, oxidation deterioration in sealing member 12 can be suppressed. Resin layer 19 is in contact with a connecting portion between first portion 15A and second portion 16A and a connecting portion between first portion 15B and second portion 16B (more specifically, a connecting portion between filamentous portion 15A and rod-shaped portion 17A and a connecting portion between filamentous portion 15B and rod-shaped portion 17B). And resin layer 19 is also in contact with both first portions 15A, 15B and second portions 16A, 16B around the connecting portions. Although linear expansion coefficient $\alpha_1$ of the first metal is different from linear expansion coefficient $\alpha_2$ of the second metal ($\alpha_1 < \alpha_2$), deterioration in resin layer 19 can be suppressed, even if tab terminals 14A, 14B expand upon being exposed to heat, by adjusting linear expansion coefficients $\alpha_r$, $\alpha_1$, and $\alpha_2$ of resin layer 19 so as to satisfy the above relation.

Capacitor element 10 includes, for example, a wound structure as shown in FIG. 2, and may be prepared by bonding a conductive polymer to the wound structure. The wound structure includes anode foil 21 having a dielectric layer, cathode foil 22, and separators 23 disposed between anode foil 21 and cathode foil 22. The conductive polymer is attached on a surface of the dielectric layer between anode foil 21 and cathode foil 22 so as to cover at least part of the surface of the dielectric layer. Tab terminal 14A and tab terminal 14B are respectively connected to anode foil 21 and cathode foil 22 of capacitor element 10.

Anode foil 21 and cathode foil 22 are wound with separator 23 disposed between anode foil 21 and cathode foil 22. An outermost circumference of the wound structure is fixed with a winding stop tape 24. Note that FIG. 2 is a development view illustrating part of the wound structure while the outermost circumference is not fixed.

A configuration of the electrolytic capacitor will be described in more detail below.
(Bottomed Case)

The bottomed case that houses the capacitor element is formed from, for example, metal such as aluminum, stainless steel, copper, iron, brass, or an alloy of them. The bottomed case may be formed by using the same metal as the first metal or the second metal.
(Sealing Member)

After the capacitor element is housed in the bottomed case, the opening of the bottomed case is sealed with the sealing member.

The sealing member may be an insulating material. The insulating material is preferably an elastic body. Use of a sealing member containing an elastic body such as rubber can ensure a high sealing property. From the viewpoint of easiness in obtaining high heat resistance, it is preferable to use silicone rubber, fluoro-rubber, ethylene propylene rubber, chloro-sulfonated polyethylene rubber (Hypalon™ rubber), butyl rubber, polyisoprene rubber, or the like.

The sealing member has a shape corresponding to a shape of the opening of the bottomed case (for example, a disk shape). The bottomed case is sealed by crimping the sealing member near the opening end of the bottomed case and curling the opening end. From the viewpoint of suppressing applying stress on the resin layer, the opening end (specifically, an end face of an opening portion of the bottomed case) is preferably in contact with the sealing member instead of the resin layer, as shown in FIG. 1.

A hole is formed in the sealing member so as to allow a tab terminal to penetrate through. A shape and size of the hole are determined in accordance with a shape and size of a tab terminal (specifically, the rod-shaped portion).
(Resin Layer)

The resin layer is formed on a main surface of the sealing member so as to cover at least part of the main surface. The main surface is disposed outside the bottomed case. More specifically, the resin layer is disposed on the main surface of the sealing member to cover at least a connecting portion between the first portion and the second portion and its peripheral portion so as to be in contact with the first portion and the second portion. From the viewpoint of easiness in obtaining an effect of suppressing oxidation deterioration in the sealing member, the resin layer is preferably formed to cover an entire exposed region of the bottomed case.

The resin layer may be in contact with the opening end of the bottomed case. When the entire region of the sealing member, which is exposed outside, is to be covered with the resin layer, the resin layer also easily comes into contact with the bottomed case. In such a case as well, deterioration in the resin layer can be suppressed by adjusting linear expansion coefficient $\alpha_r$ of the resin layer.

A resin to be contained in the resin layer is preferably, for example, a cured material of a curable resin composition. From the viewpoint of easiness in adjusting linear expansion coefficient $\alpha_r$, the resin layer preferably contains a resin and a filler. The curable resin composition may further contain a curing agent, a polymerization initiator, a catalyst, and the like. Examples of the curable resin include a photo-curable resin and a thermosetting resin.

As the curable resin, for example, a compound cured or polymerized by an effect of light or heat (for example, a monomer, oligomer, or prepolymer) is used. Such compounds (or curable resins) include, for example, an epoxy compound, phenolic resin, urea resin, polyimide, polyurethane, diallyl phthalate, and unsaturated polyester. The curable resin composition may contain a plurality of curable resins.

It is preferable to use, as a filler, for example, insulating particles and/or fiber. Examples of the insulating material for a filler include an insulating compound (oxide or the like) such as silica or alumina, glass, and a mineral material (for example, talc, mica, or clay). The resin layer may contain one type or two or more types of these fillers.

Although it depends on the linear expansion coefficients of the first metal and the second metal, a content of the filler in the resin layer is between 30 wt % and 80 wt % (inclusive), preferably between 45 wt % and 75 wt % (inclusive), or may be between 50 wt % and 75 wt % (inclusive). When the content of the filler falls in such a range, linear expansion coefficient $\alpha_r$ can be easily adjusted within the above range.

Note that the linear expansion coefficient of the resin layer can be adjusted by adjusting a shape and content of filler, a type and content of resin, a type and content of additive, and the like.

The resin layer can be formed by, for example, forming a coating film by coating the main surface of the sealing member with the curable resin composition and curing the coating film by irradiating the coating film with light or heating the coating film. At this time, the coating film of the curable resin composition is formed so as to be in contact with both the first portion and the second portion.

A thickness of the resin layer is, for example, more than or equal to 100 µm, preferably more than or equal to 300 µm. When the thickness of the resin layer falls within such a range, it is easy to suppress degradation in the resin layer due to stress while suppressing oxidation deterioration in the sealing member.

(Tab Terminal)

The tab terminal includes a first portion containing a first metal and a second portion containing a second metal. One end portion (specifically, the second portion) of the tab terminal is connected to the capacitor element, and the other end portion (specifically, the first portion) is led out from the hole of the sealing member. The resin layer is in contact with a portion of the tab terminal, which is exposed outward from the sealing member. More specifically, the first portion and second portion of the tab terminal are connected to each other by welding or the like. This connecting portion is exposed outward from the sealing member. The resin layer is preferably in contact with at least this connecting portion and its peripheral portion.

The second portion has, for example, a rod-shaped portion penetrating through the sealing member. A distal end of the rod-shaped portion is exposed outward from the sealing member. The second portion may have a flat portion connected to the capacitor element. The flat portion facilitates connection to the capacitor element. A shape of the rod-shaped portion is not specifically limited and may be a round rod shape (for example, a rod shape having a circular or elliptic section) or a square rod shape (for example, a rod shape having a polygonal section).

When the second portion has a flat portion, the flat portion and the rod-shaped portion may be electrically connected to each other or integrated. For example, the flat portion is formed by rolling one end portion of a rod-shaped portion containing the second metal while a region that has not been rolled is left as a rod-shaped portion. This can form the second portion having the flat portion and the rod-shaped portion integrated with each other.

The first portion has, for example, a filamentous portion extending from a distal end of the rod-shaped portion, which is exposed from the sealing member. The filamentous portion is connected to one end portion of the rod-shaped portion by welding or the like. A shape of the filamentous portion is not specifically limited and may be a wire shape or a ribbon shape.

Linear expansion coefficient $\alpha_1$ of the first metal (or the first portion) is, for example, less than or equal to $23.0\times 10^{-6}/°$ C., preferably less than or equal to $20.0\times 10^{-6}/°$ C., or may be less than or equal to $18.0\times 10^{-6}/°$ C. Linear expansion coefficient $\alpha_1$ may be more than or equal to $9.0\times 10^{-6}/°$ C.

A difference ($=\alpha_2-\alpha_1$) between linear expansion coefficient $\alpha_2$ of the second metal (or the second portion) and linear expansion coefficient $\alpha_1$ may be, for example, more than or equal to $0.5\times 10^{-6}/°$ C. or more than or equal to $23.5\times 10^{-6}/°$ C. The difference ($\alpha_2-\alpha_1$) is, for example, less than or equal to $30.0\times 10^{-6}/°$ C.

When $\alpha_1$ and ($\alpha_2-\alpha_1$) fall within such ranges, it is easy to adjust linear expansion coefficient $\alpha_r$ of the resin layer while ensuring high conductivity and current collection property of the tab terminal.

Examples of the first metal include iron, copper, nickel, and tin. The first metal may contain one type or two or more types of these metals. The first metal may be a single metal or an alloy including the above metals. An example of the second metal can be aluminum. Specific examples of the second metal include metal aluminum and an aluminum alloy. Use of these metals will facilitate adjusting linear expansion coefficient $\alpha_r$ of the resin layer while ensuring high conductivity of the tab terminal.

Note that the first portion may include a member containing at least one type of meal (for example, iron and/or copper) selected from the above group and a plating film containing other metal (for example, tin) selected from the above group.

A size of the tab terminal (the rod-shaped portion, the flat portion, or the like) may be appropriately determined in accordance with a size of the electrolytic capacitor, a thickness of the sealing member, or the like.

(Capacitor Element)
(Anode Foil)

An example of the anode foil is a metal foil having a roughened surface. Although a type of metal forming the metal foil is not specifically limited, it is preferable to use a valve metal such as aluminum, tantalum, or niobium or an alloy containing a valve metal from the viewpoint of easiness in forming the dielectric layer.

A metal foil surface can be roughened by a known method. A plurality of unevenness are formed in a surface of the metal foil by roughening. The roughening is preferably performed by, for example, etching the metal foil. The etching may be performed by, for example, a DC electrolytic method or an AC electrolytic method.

(Dielectric Layer)

The dielectric layer is formed on a surface of the anode foil. More specifically, since the dielectric layer is formed on the roughened surface of the metal foil, the dielectric layer is formed along inner wall surfaces of holes or recesses (pits) in the surface of the anode foil.

Although a method of forming the dielectric layer is not specifically limited, the dielectric layer can be formed by anodizing treatment of the metal foil. The anodizing treatment may be performed by, for example, immersing the metal foil in an anodizing solution such as ammonium adipate. In the anodizing treatment, a voltage may be applied to the metal foil immersed in the anodizing solution.

In general, from the viewpoint of mass productivity, the roughening and the anodizing treatment are performed for a metal foil formed from a large-sized valve metal foil or the like. In this case, an anode foil on which a dielectric layer is formed is prepared by cutting the processed foil in a desired size.

(Cathode Foil)

As the cathode foil, for example, a metal foil is used. Although a type of metal is not specifically limited, it is preferable to use a valve metal such as aluminum, tantalum, or niobium or an alloy containing a valve metal. Roughening and/or anodizing treatment may be performed for the cathode foil, as needed. The roughening and the anodizing treatment can be performed by the method described concerning the anode foil.

(Separator)

The separator is not specifically limited. For example, it is possible to use an unwoven fabric containing a fiber material such as cellulose, polyethylene terephthalate, vinylon, or polyamide (for example, aliphatic polyamide or aromatic polyamide such as aramid).

The capacitor element can be manufactured by a known method. For example, the capacitor element may be prepared by superposing the anode foil on which the dielectric layer is formed and the cathode foil with the separator interposed between the anode foil and the cathode foil, and then forming the conductive polymer layer between the anode foil and the cathode foil. The capacitor element may also be prepared by winding the anode foil on which the dielectric layer is formed and the cathode foil with the separator interposed between the anode foil and the cathode foil to form the wound structure as shown in FIG. 2, and then forming the conductive polymer layer between the anode foil and the cathode foil. When the wound structure is formed, tab terminals 14A and 14B may be formed upright on the wound structure as shown in FIG. 2 by winding the anode and cathode foils around the tab terminals.

An end portion of one of the anode foil, the cathode foil, and the separator, which is positioned on an outermost layer of the wound structure (cathode foil 22 in FIG. 2), on an outside surface is fixed with a winding stop tape. Note that when the anode foil is prepared by cutting a large-sized metal foil, anodizing treatment may further be performed for the capacitor element in the form of the wound structure or the like so as to provide the dielectric layer on a cutting surface of the anode foil.

It is possible to use, as the electrolyte, an electrolytic solution, a solid electrolyte, or both.

The electrolytic solution may be a non-aqueous solvent or a mixture of a non-aqueous solvent and an ionic material (a solute, for example, an organic salt) dissolved in the non-aqueous solvent. The non-aqueous solvent may be an organic solvent or an ionic solution. It is possible to use, as the non-aqueous solvent, for example, ethylene glycol, propylene glycol, sulfolane, γ-butyrolactone, or N-methyl-acetamide. Examples of the organic salts include trimethyl-amine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

The solid electrolytes contain a manganese compound and a conductive polymer. It is possible to use, as the conductive polymer, for example, polypyrrole, polythiophene, polyaniline, and derivatives of them. The solid electrolyte containing the conductive polymer can be formed by, for example, chemical polymerization and/or electropolymerization of a raw material monomer on the dielectric layer. Alternatively, the solid electrolyte can be formed by coating the dielectric layer with a solution in which the conductive polymer is dissolved or a dispersion liquid in which the conductive polymer is dispersed.

[Method For Manufacturing Electrolytic Capacitor]

The above electrolytic capacitor can be manufactured by the manufacturing method including: sealing an opening of the bottomed case with a sealing member, the bottomed case housing the capacitor element to which the tab terminal is connected, the sealing member being a member through which the tab terminal extending from the capacitor element penetrates; and forming, after the sealing, the resin layer on a main surface of the sealing member so as to cover at least part of the main surface, the main surface being disposed outside the bottomed case. The wound structure and the capacitor element are housed in the bottomed case such that the tab terminal connected to the wound structure and the capacitor element is positioned at a side close to the opening of the bottomed case. The electrolyte is impregnated in the capacitor element before the sealing. In addition, aging processing may be performed for an assembled electrolytic capacitor while a rated voltage is applied to the electrolytic capacitor.

Each step will be described in detail below.
(Sealing Step)

In the sealing step, for example, the sealing member penetrating through the tab terminal, which is extending from the capacitor element, is disposed above the capacitor element that is housed in the bottomed case. And then, the sealing member is fixed at a position near the opening end of the bottomed case by lateral drawing. The opening end of the bottomed case is curled for crimping the sealing member near the opening end.

When the sealing member is disposed above the capacitor element, the tab terminal (specifically, a rod-shaped portion) extending from the capacitor element is made to penetrate through a hole formed in the sealing member, and the first portion (specifically, a filamentous portion) is led out.

When the seat plate as shown in FIG. 1 is to be disposed, the seat plate may be disposed above the curled portion.
(Resin Layer Forming Step)

In this step, after the sealing is performed, the resin layer is formed on the main surface (upper surface) of the sealing member. The main surface is disposed outside the bottomed case. For example, the resin layer formed from the cured material of the curable resin composition can be formed by forming a coating film by coating the above main surface of the sealing member with the curable resin composition and curing the coating film. The coating film can be formed by a known coating method.

The coating film can be cured by irradiation with light or heating in accordance with a type of curable resin contained in the curable resin composition. Note that the resin layer may be formed integrally with the seat plate. Such a resin layer can be formed by, for example, covering a periphery of the sealing member with a mold, forming the coating film by injecting the curable resin composition into the mold (or injection forming), and curing the coating film.

The above exemplary embodiment describes a wound type electrolytic capacitor. However, an application range of the present disclosure is not limited to the above. The present disclosure can also be applied to other types of electrolytic capacitors, for example, a chip type electrolytic capacitor including a metal sintered body instead of an anode foil and a stacked electrolytic capacitor formed by stacking an anode foil. The present disclosure can also be applied to an electrical double layer capacitor and an electricity storage device such as a lithium ion capacitor.

EXAMPLES

The present disclosure will be described in detail below based on examples and comparative examples. It is noted that the present disclosure is not limited to the following examples.

Example 1

In this example, a wound type electrolytic capacitor (diameter of 10 mm×length of 10 mm) with a rated voltage of 35 V and a rated capacitance of 270 μF was prepared. A specific method for manufacturing the electrolytic capacitor will be described below.
(Preparation of Capacitor Element)

A dielectric layer was formed by performing anodizing treatment for an aluminum foil having a roughened surface by using an ammonium adipate solution. The obtained anode foil was cut in a predetermined size. A wound structure was prepared by connecting flat portions of tab terminals to respective aluminum foils used as an anode foil and a cathode foil, winding the anode foil and the cathode foil with a separator interposed between the anode foil and the cathode foil, and fixing an outside surface with a winding stop tape. At this time, when the foils and the separator were wound around the tab terminals, rod-shaped portions and filamentous portions of the tab terminals were extracted from the wound structure. Anodizing treatment was performed again for the wound structure by using an ammonium adipate solution.

The filamentous portion of each tab terminal used in this case contained iron, and has linear expansion coefficient $\alpha_1$ was $11.7 \times 10^{-6}$. The rod-shaped portion and the flat portion of each tab terminal contained aluminum, and have linear expansion coefficient $\alpha_2$ was $23.5 \times 10^{-6}$. The linear expansion coefficients were measured under a condition of a temperature rise rate of 5° C./min by using a commercially available thermomechanical analyzer (Thermo plus TMA8310 manufactured by Rigaku Corporation).

The wound structure was immersed in a conductive polymer dispersion containing polyethylene dioxythiophene, polystyrene sulfonic acid, and water, which is contained in a predetermined container, for 5 min in a reduced-pressure atmosphere (40 kPa). Thereafter, the wound structure was pulled out from the conductive polymer dispersion. The wound structure that had been impregnated with the conductive polymer dispersion was dried for 20 min at 150° C. in a drying furnace so as to attach the conductive polymer between the anode foil and the cathode foil of the wound structure. The capacitor element was completed in this manner and housed in a bottomed cylindrical case having a diameter of 10 mm and a length of 10 mm.

(Impregnation With Electrolytic Solution)

An electrolytic solution was injected into the case and impregnated in the capacitor element in a reduced-pressure atmosphere (40 kPa). As the electrolytic solution, a solution containing γ-butyrolactone, sulfolane, and ethyldimethylamine phthalate was used.

(Sealing of Capacitor Element)

The tab terminals led out from the capacitor element were made to penetrate through a butyl rubber sealing member as shown in FIG. 1, and then filamentous portions were extracted outward from the sealing member. In this state, the sealing member was fitted in an opening of the case and fixed by deep drawing. The capacitor element was sealed by curling the opening end of the case.

(Formation of Resin Layer)

A resin layer (thickness: 0.3 mm) as shown in FIG. 1 was formed by coating an upper surface of the sealing member with a thermosetting resin composition containing epoxy resin, spherical silica having an average particle size of 10 μm as a filler, and a curing agent to form a coating film, and heating the coating film to a temperature more than or equal to a curing temperature of the thermosetting resin composition. A content of the filler with respect to a total solid content (that is, the formed resin layer) of the thermosetting resin composition was 75 mass %. In addition, linear expansion coefficient $\alpha_r$ of the resin layer was $19 \times 10^{-6}$/° C. ($\alpha_1 < \alpha_r < \alpha_2$).

Subsequently, aging processing was performed for 2 hours at 130° C. while a rated voltage was applied to the resin layer. In this manner, an electrolytic capacitor was completed.

(Evaluation)

(Capacitance and ESR)

A capacitance and an ESR value of each obtained electrolytic capacitor were obtained in the following procedure.

A capacitance (initial capacitance) (μF) of the electrolytic capacitor at a frequency of 120 Hz was measured by using a 4-terminal LCR meter.

An ESR value (initial ESR value) (mΩ) of the electrolytic capacitor at a frequency of 100 kHz was measured by using the 4-terminal LCR meter.

Capacitances and ESR values of 10 randomly selected electrolytic capacitors were measured, and average values were calculated.

(Leakage Current)

The randomly selected 10 electrolytic capacitors were stored at 165° C. for 1,500 hours. A voltage of 35 V was then applied between the anode foil and the cathode foil of each electrolytic capacitor, and a leakage current was measured after a lapse of 120 sec. Any electrolytic capacitors that exhibited a leakage current amount exceeding 500 μA were determined as defective products. The ratio of the number of defective products with respect to the 10 electrolytic capacitors was regarded as an LC failure rate, which was used as a leakage current index.

(Deterioration in Resin Layer)

Randomly selected 120 electrolytic capacitors were stored at 165° C. for 150 hours, and deteriorations (cracks) in resin layers were visually observed. The number of electrolytic capacitors in which cracks in resin layers was measured, and a ratio of the number of the electrolytic capacitors per 10 electrolytic capacitors was obtained.

Example 2

An electrolytic capacitor with a resin layer was formed and evaluated in the same manner as in Example 1 except that a content of the filler with respect to the entire solid content of the curable resin composition was changed to be 70 mass %. Linear expansion coefficient $\alpha_r$ of the resin layer was $20 \times 10^{-6}$/° C. ($\alpha_1 < \alpha_r < \alpha_2$).

Example 3

An electrolytic capacitor with a resin layer was formed and evaluated in the same manner as in Example 1 except that a content of the filler with respect to the entire solid content of the curable resin composition was changed to be 85 mass %. Linear expansion coefficient $\alpha_r$ of the resin layer was $10 \times 10^{-6}$/° C. ($\alpha_r < \alpha_1 < \alpha_2$).

Comparative Example 1

An electrolytic capacitor was formed and evaluated in the same manner as in Example 1 except that no resin layer was formed. In Comparative Example 1, deterioration (crack) in the sealing member was evaluated instead of deterioration in the resin layer.

Comparative Example 2

An electrolytic capacitor with a resin layer was formed and evaluated in the same manner as in Example 1 except that a content of the filler with respect to the entire solid content of the curable resin composition was changed to be 50 mass %. Linear expansion coefficient $\alpha_r$ of the resin layer was $38 \times 10^{-6}$/° C. ($\alpha_1 < \alpha_2 < \alpha_r$).

Table 1 shows evaluation results in the examples and the comparative examples. A1 to A3 correspond to the examples 1 to 3, respectively, and B1 and B2 correspond to the comparative examples 1 and 2, respectively.

TABLE 1

| | Initial Capacitance (μF) | ESR (Ω) | LC Failure Rate (Number/10) | Deterioration in Resin Layer (Number/10) |
|---|---|---|---|---|
| A1 | 272 | 0.025 | 0 | 0 |
| A2 | 271 | 0.027 | 0 | 0 |
| A3 | 272 | 0.025 | 2 | 6 |
| B1 | 273 | 0.026 | 10 | 10* |
| B2 | 271 | 0.027 | 8 | 10 |

*Number of electrolytic capacitors in which cracks occurred in sealing members

As shown in Table 1, the examples that satisfied a relation of $\alpha_1 < \alpha_r < \alpha_2$ or a relation of $\alpha_r < \alpha_1 < \alpha_2$ succeeded in reducing deterioration in the resin layer and reducing the LC failure rate as compared with Comparative Example 2. In Comparative Example 1 having no resin layer, cracking occurred in sealing members of all electrolytic capacitors, and the LC failure rate was 100%. In Comparative Example 2 in which $\alpha_r$ was greater than $\alpha_1$ and $\alpha_2$, cracking occurred in resin layers of all electrolytic capacitors, and the LC failure rate was 80%. From the viewpoint of further improving deteriorations in resin layers and LC failure rates, it is more preferable to set the linear expansion coefficients to satisfy the relation $\alpha_1 < \alpha_r < \alpha_2$.

The present disclosure can be applied to electrolytic capacitors including sealing members (hybrid electrolytic capacitors, solid electrolytic capacitors, and the like).

What is claimed is:

1. An electrolytic capacitor comprising:
    a capacitor element;
    a bottomed case that houses the capacitor element;
    a sealing member that seals an opening of the bottomed case;
    a tab terminal connected to the capacitor element and penetrating through the sealing member; and
    a resin layer that covers at least part of a main surface of the sealing member, the main surface being disposed outside the bottomed case,
    wherein:
    the tab terminal includes a first portion containing a first metal and a second portion containing a second metal,
    the resin layer is in contact with the first portion and the second portion, the resin layer covering a connecting portion between the first portion and the second portion, and
    linear expansion coefficient $\alpha_1$ of the first metal, linear expansion coefficient $\alpha_2$ of the second metal, and linear expansion coefficient $\alpha_r$ of the resin layer satisfy a relation of $\alpha_1 < \alpha_r < \alpha_2$ or $\alpha_r < \alpha_1 < \alpha_2$.

2. The electrolytic capacitor according to claim 1, wherein the resin layer is in contact with an opening end of the bottomed case.

3. The electrolytic capacitor according to claim 1, wherein:
    the first metal includes at least one selected from the group consisting of iron, copper, nickel, and tin, and
    the second metal includes aluminum.

4. The electrolytic capacitor according to claim 1, wherein:
    the second portion includes a rod-shaped portion connected to the capacitor element and penetrating through the sealing member, and
    the first portion includes a filamentous portion extending from a distal end of the rod-shaped portion, the filamentous portion being exposed from the sealing member.

5. A method for manufacturing an electrolytic capacitor, the method comprising:
    sealing an opening of a bottomed case with a sealing member, the bottomed case housing a capacitor element to which a tab terminal is connected, the sealing member being a member through which the tab terminal extending from the capacitor element penetrates; and
    forming, after the sealing, a resin layer on a main surface of the sealing member so as to cover at least part of the main surface, the main surface being disposed outside the bottomed case,
    wherein:
    the tab terminal includes a first portion containing a first metal and a second portion containing a second metal,
    the resin layer is in contact with the first portion and the second portion, the resin layer covering a connecting portion between the first portion and the second portion, and
    linear expansion coefficient $\alpha_1$ of the first metal, linear expansion coefficient $\alpha_2$ of the second metal, and linear expansion coefficient $\alpha_r$ of the resin layer satisfy a relation of $\alpha_1 < \alpha_r < \alpha_2$ or $\alpha_r < \alpha_1 < \alpha_2$.

6. The electrolytic capacitor according to claim 1, wherein $\alpha_1 < \alpha_r < \alpha_2$ is satisfied.

7. The method according to claim 5, wherein $\alpha_1 < \alpha_r < \alpha_2$ is satisfied.

* * * * *